US009303759B2

(12) United States Patent
Jeon et al.

(10) Patent No.: US 9,303,759 B2
(45) Date of Patent: Apr. 5, 2016

(54) METHOD AND SYSTEM OF CONTROLLING SHIFT FOR VEHICLE

(71) Applicants: Hyundai Motor Company, Seoul (KR); Kia Motors Corporation, Seoul (KR)

(72) Inventors: Byeongwook Jeon, Seoul (KR); Donghoon Jeong, Osan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/543,672

(22) Filed: Nov. 17, 2014

(65) Prior Publication Data

US 2015/0159749 A1   Jun. 11, 2015

(30) Foreign Application Priority Data

Dec. 5, 2013   (KR) .................. 10-2013-0150691

(51) Int. Cl.
*G06F 17/00* (2006.01)
*F16H 61/02* (2006.01)
*F16H 59/18* (2006.01)
*F16H 59/44* (2006.01)
*F16H 59/66* (2006.01)

(52) U.S. Cl.
CPC ............ *F16H 61/0213* (2013.01); *F16H 59/18* (2013.01); *F16H 59/44* (2013.01); *F16H 2059/666* (2013.01)

(58) Field of Classification Search
None
See application file for complete search history.

(56) References Cited

U.S. PATENT DOCUMENTS

| | | | | |
|---|---|---|---|---|
| 5,752,214 A * | 5/1998 | Minowa | ............. | B60K 31/0008 701/111 |
| 5,890,087 A * | 3/1999 | Ryoo | ............. | F16H 59/66 701/409 |
| 6,220,986 B1 * | 4/2001 | Aruga | ............. | F16H 61/0213 477/97 |
| 8,090,511 B2 * | 1/2012 | Kuwahara | ............. | F16H 61/0213 477/107 |
| 8,099,220 B2 * | 1/2012 | Kim | ............. | F16H 61/0213 477/97 |
| 8,160,781 B2 * | 4/2012 | Naono | ............. | G05B 13/024 307/10.1 |
| 9,182,035 B2 * | 11/2015 | Jeong | ............. | F16H 61/0204 |
| 2010/0100293 A1 * | 4/2010 | Takanami | ............. | F16H 61/0213 701/65 |

FOREIGN PATENT DOCUMENTS

| | | | |
|---|---|---|---|
| JP | 11-222055 | A | 8/1999 |
| JP | 11-240434 | A | 9/1999 |
| JP | 3178471 | B2 | 4/2001 |
| JP | 2001-235026 | A | 8/2001 |
| JP | 2010-160755 | A | 7/2010 |
| JP | 4577827 | B2 | 9/2010 |

* cited by examiner

*Primary Examiner* — Dirk Wright

(74) *Attorney, Agent, or Firm* — Morgan, Lewis & Bockius LLP

(57) ABSTRACT

A method and a system of controlling shift for a vehicle may include an accelerator pedal position sensor detecting a position of an accelerator pedal, a vehicle speed sensor detecting vehicle speed, a navigation device configured to provide road information including gradient and radius of curvature of a road, and a controller receiving information on input variables including the position of the accelerator pedal and the vehicle speed from the accelerator pedal position sensor and the vehicle speed sensor, determining a short term driving tendency factor of a driver and target shift-speed based on the information, receiving information on the radius of curvature of a front road from the navigation device, determining adjusted shift-speed based on the short term driving tendency factor, the radius of curvature of the front road, and the target shift-speed, and controlling the shift to the adjusted shift-speed.

13 Claims, 3 Drawing Sheets

METHOD AND SYSTEM OF CONTROLLING SHIFT FOR VEHICLE

CROSS-REFERENCE TO RELATED APPLICATION

The present application claims priority to and the benefit of Korean Patent Application No. 10-2013-0150691 filed on Dec. 5, 2013, the entire contents of which is incorporated herein for all purposes by this reference.

BACKGROUND OF THE INVENTION

1. Field of the Invention

The present invention relates to a method and a system of controlling shift for a vehicle. More particularly, the present invention relates to a method and a system of controlling shift for a vehicle that controls the shift to shift-speed adjusted according to radius of curvature of a front road and a short term driving tendency factor of a driver.

2. Description of Related Art

Customer satisfaction related to driving performance of a vehicle depends on how precisely the vehicle runs in accordance with a tendency of the customer. While tendencies of the customers vary, however, performance characteristic of the vehicle is set to one performance characteristic in the same vehicle model. Therefore, reaction of the vehicle may not coincide with the tendency of the customer. Accordingly, the customer often lodges a complaint against the driving performance of the vehicle. That is, if the driving tendency of the customer is grasped and a shift of the vehicle is controlled to coincide with the tendency of the customer, the customer satisfaction related to the driving performance may be maximized.

Therefore, many methods of learning the driving tendency of the customer for a long time and controlling the shift according to the learned driving tendency have been developed. The method of controlling the shift according to the learned driving tendency is performed under the assumption that the driving tendency of the customer is constant. The driving tendency of the driver, however, is not constant and changes according to temporary changes of driver's feeling or driving will, road condition and so on. Therefore, the learned driving tendency may differ greatly from an actual driving tendency of the driver at one point. If the shift is controlled according to the learned driving tendency, the actual driving will of the driver may not be reflected on the shift and the driver may dissatisfy with the driving performance.

For example, if the driver pushes an accelerator pedal deeply, a conventional system of controlling shift does not differentiate that the driver pushes the accelerator pedal deeply to runs the vehicle on an uphill road from that the driver pushes the accelerator pedal deeply to accelerate the vehicle. Therefore, the driver files complaints due to false shift control.

Meanwhile, even though a curvature road exists in front of the vehicle, the vehicle runs on the basis of the driver's will (e.g., operation of the accelerator pedal). However, the vehicle may enter the curvature road or may exit from the curvature road in a state that the driver does not recognize radius of curvature of the front road precisely. If the vehicle enters the road having small radius of curvature at high shift-speed, it may have higher risk of accidents and fuel economy may be deteriorated due to sudden brake. On the contrary, if the vehicle exits from the curvature road at low shift-speed, acceleration feel may be deteriorated. Therefore, the shift should be controlled according to the radius of curvature of the front road.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method and a system of controlling shift for a vehicle having advantages of driving the vehicle at an optimum shift-speed according to radius of curvature of a front road and driving tendency of a driver.

A system of controlling shift for a vehicle according to an exemplary embodiment of the present invention may include: an accelerator pedal position sensor detecting a position of an accelerator pedal, a vehicle speed sensor detecting vehicle speed, a navigation device configured to provide road information including gradient and radius of curvature of a road, and a controller receiving information on input variables including the position of the accelerator pedal and the vehicle speed from the accelerator pedal position sensor and the vehicle speed sensor, determining a short term driving tendency factor of a driver and target shift-speed based on the information, receiving information on the radius of curvature of a front road from the navigation device, determining adjusted shift-speed based on the short term driving tendency factor, the radius of curvature of the front road, and the target shift-speed, and controlling the shift to the adjusted shift-speed.

The navigation device may further provide information on the gradient of the road to the controller, wherein the controller determines the short term driving tendency factor of the driver by further considering the gradient of the road.

The controller may be configured to control the shift to the target shift-speed when the radius of curvature of the front road is greater than or equal to a predetermined radius of curvature.

The short term driving tendency factor of the driver may be classified into at least two regions and the adjusted shift-speed may be maintained under the same target shift-speed and the same radius of curvature at each region.

The controller may be configured to continue the shift to the adjusted shift-speed even though the input variables change while the shift to the adjusted shift-speed is controlled.

A system of controlling shift for a vehicle according to another exemplary embodiment of the present invention may include: an accelerator pedal position sensor detecting a position of an accelerator pedal, a vehicle speed sensor detecting vehicle speed, a navigation device configured to provide road information including gradient and radius of curvature of a road, and a controller receiving information on input variables including the position of the accelerator pedal and the vehicle speed from the accelerator pedal position sensor and the vehicle speed sensor, determining a short term driving tendency factor of a driver and target vehicle speed based on the information, receiving information on the radius of curvature of a front road from the navigation device, determining adjusted vehicle speed based on the short term driving tendency factor, the radius of curvature of the front road, and the target vehicle speed, and controlling the shift to the adjusted vehicle speed.

the navigation device may further provide information on the gradient of the road to the controller, wherein the controller determines the short term driving tendency factor of the driver by further considering the gradient of the road.

The controller may be configured to run the vehicle with the target vehicle speed when the radius of curvature of the front road is greater than or equal to a predetermined radius of curvature.

A method of controlling shift for a vehicle according to other exemplary embodiment of the present invention may include: determining whether a curvature road exists in front of the vehicle based on a current position of the vehicle, determining radius of curvature of a front road when the curvature road exists in front of the vehicle, detecting input variables including a position of an accelerator pedal and vehicle speed, determining a short term driving tendency factor based on the input variables, determining target shift-speed based on the input variables, determining adjusted shift-speed based on the target shift-speed, the short term driving tendency factor, and the radius of curvature of the front road, and controlling the shift to the adjusted shift-speed.

The short term driving tendency factor may be determined by further considering gradient of the road.

The adjusted shift-speed may be the same as the target shift-speed when the radius of curvature of the front road is greater than or equal to a predetermined radius of curvature.

The short term driving tendency factor of driver may be classified into at least two regions and the adjusted shift-speed may be maintained under the same target shift-speed and the same radius of curvature at each region.

The adjusted shift-speed may not change even though the input variables change while the shift to the adjusted shift-speed is controlled.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
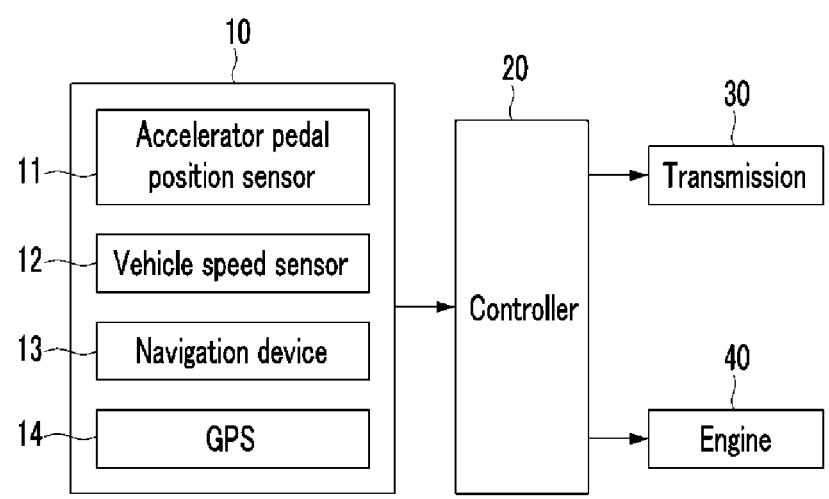
FIG. 1 is a block diagram of a system of controlling shift for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a block diagram of a system of controlling shift for a vehicle according to an exemplary embodiment of the present invention.

As shown in FIG. 1, a system of controlling shift for a vehicle according to an exemplary embodiment of the present invention includes a data detector 10, a controller 20, a transmission 30, and an engine 40.

The data detector 10 determines short term driving tendency of a driver and detects data for shift control of the vehicle. The data detected by the data detector 10 is transmitted to the controller 20. The data detector 10 includes an accelerator pedal position sensor 11, a vehicle speed sensor 12, a navigation device 13, and a global positioning system (GPS) 14.

The accelerator pedal position sensor 11 detects a degree with which a driver pushes an accelerator pedal. That is, the accelerator pedal position sensor 11 detects the data related to driver's acceleration will.

The vehicle speed sensor 12 detects a vehicle speed, and is mounted at a wheel or an output shaft of a transmission of the vehicle. On the contrary, the vehicle speed may be calculated based on a GPS signal received by the GPS.

Meanwhile, a target shift-speed may be calculated by using a shift pattern based on the signal of the accelerator pedal position sensor 11 and the signal of the vehicle speed sensor 12, and the shift to the target shift-speed is controlled. That is, hydraulic pressure supplied to a plurality of friction elements or released from the plurality of friction elements is controlled in an automatic transmission provided with a plurality of planetary gear sets and the plurality of friction elements. In addition, current applied to a plurality of synchronizer devices and actuators is controlled in a double clutch transmission.

The navigation device 13 is a device which informs the driver of a route to a destination. The navigation device 13 includes an input/output portion inputting or outputting information for guidance of the route, a current position detecting portion detecting information on a current position of the vehicle, a memory in which a map data for calculating the route and a data for guiding the route are stored, and a control portion for searching the route and performing guidance of the route. However, it may be sufficient that the navigation device 13 provides to the controller 20 information on a shape of a road including gradient of the road or radius of curvature of the road in an exemplary embodiment of the present invention. Therefore, it is to be understood that the navigation device 13 described in this specification and claims includes any device (e.g., including a server in which a map data about the road is stored) that can provides the information of the shape of the road to the controller 20.

The GPS 14 receives a signal transmitted from a GPS satellite and transmits a signal corresponding thereto to the navigation device 13.

The controller 20 calculates a short term driving tendency factor of the driver based on the data detected by the data detector 10. The short term driving tendency factor of the driver may be calculated based on how well a plurality of fuzzy rules related to the driving tendency of the driver is satisfied, and fuzzy control theory may be used to determine the short term driving tendency factor of the driver. In addition, the controller 20 controls the shift according to the short term driving tendency factor of the driver and radius of curvature of a front road. That is, the controller 20 controls a transmission 30 or an engine 40 according to the short term driving tendency factor and the radius of curvature of the front road. In further detail, the controller 20 adjusts target shift-speed according to the short term driving tendency factor and the radius of curvature of the front road and performs the shift to the adjusted shift-speed. In addition, the controller 20 restricts an output of the engine 40 according to the short term driving tendency factor and the radius of curvature of the front road. For these purposes, the controller 20 can be realized by one or more processors activated by a predetermined program, and the predetermined program can be programmed to perform each step of a method of controlling shift according to an exemplary embodiment of the present invention.

Meanwhile, the short term driving tendency factor represents a factor related to the driving tendency of the driver, but does not represent a factor related to the driving tendency of the driver only for a short time.

Hereinafter, referring to FIG. 2 and FIG. 3, a method of controlling shift for a vehicle according to an exemplary embodiment of the present invention will be described in detail.

Figure 2:
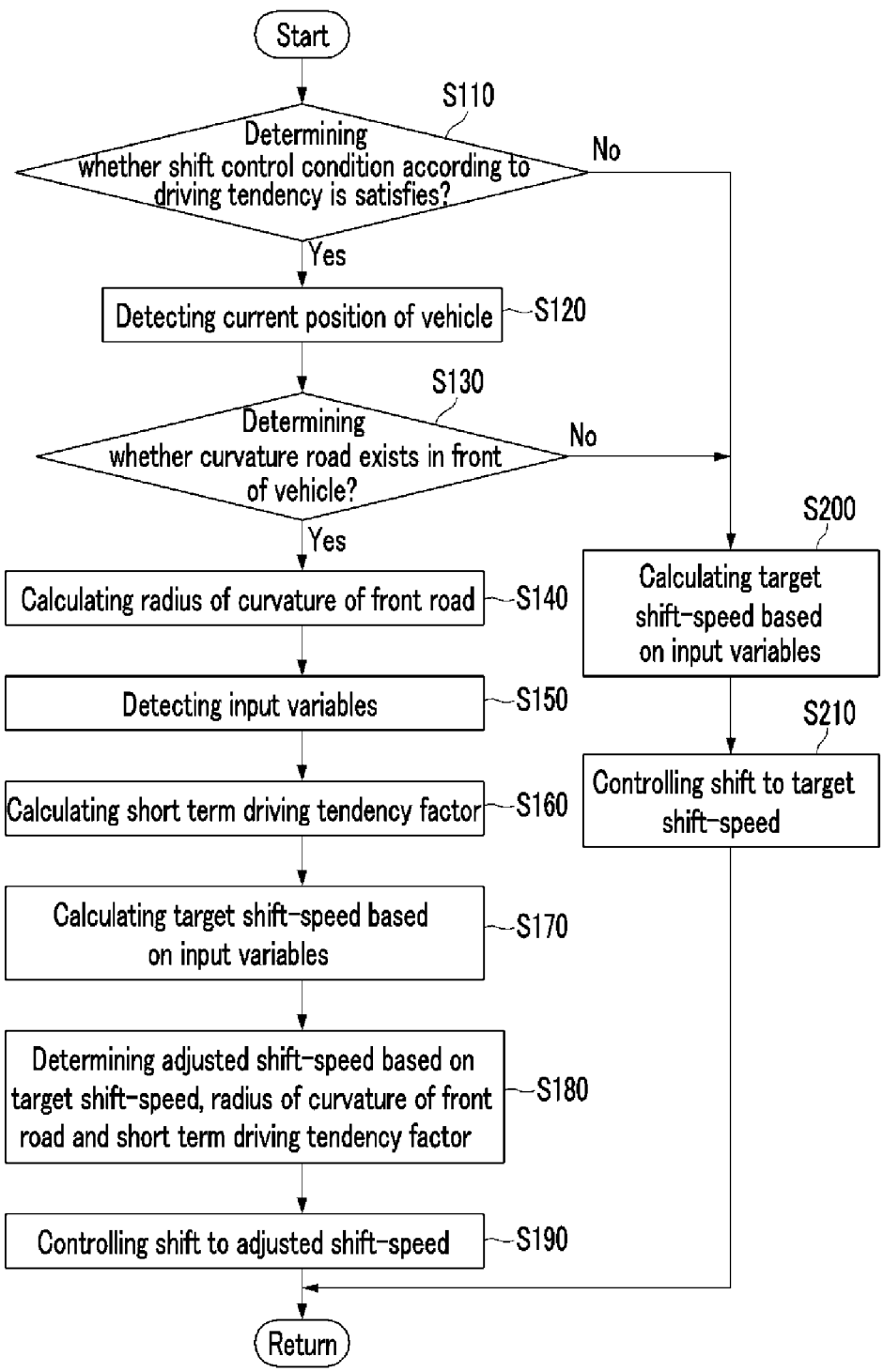
FIG. 2 is a flowchart of a method of controlling shift for a vehicle according to an exemplary embodiment of the present invention.
Figure 3:
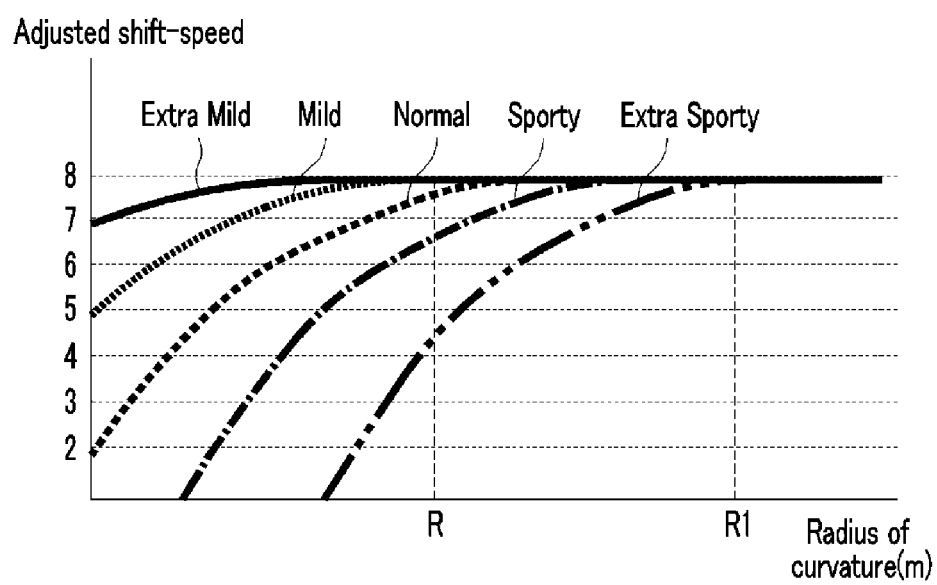
FIG. 3 is a graph illustrating examples of adjusted shift-speed according to radius of curvature of a front road and short term driving tendency factor.

FIG. 2 is a flowchart of a method of controlling shift for a vehicle according to an exemplary embodiment of the present invention, and FIG. 3 is a graph illustrating examples of adjusted shift-speed according to radius of curvature of a front road and short term driving tendency factor.

As shown in FIG. 2, the method of controlling shift according to the exemplary embodiment of the present invention begins with determining whether a shift control condition according to the driving tendency is satisfied. That is, the controller 20 determines whether the shift control condition according to the driving tendency is satisfied at step S110 while the vehicle runs. The shift control condition according to the driving tendency is satisfied when the driver wants the shift according to the driving tendency (e.g., turning on or off an operating switch) or the shift according to the driving tendency is not unnecessary (e.g., the vehicle runs on a very congested road.

If shift control condition according to the driving tendency is satisfied at step S110, the controller 20 detects the current position of the vehicle. For example, coordinate data corresponding to the current position of the vehicle is determined based on signal transmitted from a GPS satellite, and the coordinate data is matched with the map data so as to detect the current position of the vehicle.

If the current position of the vehicle is detected, the controller 20 determines whether a curvature road exists in front of the vehicle based on the map data and information on the shape of the road provided from the navigation device 13 at step S130. Herein, the front of the vehicle means that a position that distances from the vehicle along heading direction of the vehicle by a predetermined distance or less.

If the curvature road exists in front of the vehicle at the step S130, the controller 20 calculates the radius of curvature of the front road at step S140. Since a method of calculating the radius of curvature of the front road based on the map data is well known to a person of an ordinary skill in the art, detailed description thereof will be omitted.

After that, the data detector 10 detects the input variables at step S150. That is, the accelerator pedal position sensor 11 detects the position of the accelerator pedal, the vehicle speed sensor 12 detects the vehicle speed, and the navigation device 13 detects the gradient of the road. In addition, the accelerator pedal position sensor 11, the vehicle speed sensor 12, and the navigation device 13 transmits information on the detected input variables to the controller 20. It is illustrated in FIG. 2 that the data detector 10 detects the input variables after the controller 20 calculates the radius of curvature of the front road, but is not limited. For example, the input variables may be detected simultaneously when the current position of the vehicle is detected at the step S120.

If the data detector 10 detects and transmits the data to the controller 20, the controller 20 calculates the short term driving tendency factor at step S160. That is, the controller 20 calculates the short term driving tendency factor of the driver based on how well the plurality of fuzzy rules related to the driving tendency of the driver is satisfied. Since a method of calculating the short term driving tendency factor of the driver is described in Korean Patent Application No. 10-2013-0114692, detailed description thereof will be omitted. In addition, it is to be understood that the entire contents of Korean Patent Application No. 10-2013-00114692 are incorporated herein by reference.

If the short term driving tendency factor is calculated at the step S160, the controller 20 calculates the target shift-speed based on the input variables at step S170. Typically, the controller 20 always calculates the target shift-speed from a shift pattern map based on the vehicle speed and the position of the accelerator pedal and controls the shift according to the calculated target shift-speed. The target shift-speed at the step S170 is calculated so as to determine the adjusted shift-speed. In addition, the target shift-speed may be calculated by further considering the short term driving tendency factor of the driver. Meanwhile, since current shift-speed is engaged based on the vehicle speed and the position of the accelerator pedal, the current shift-speed instead of the target shift-speed may be used. Therefore, it is to be understood that the target shift-speed in this specification and claims includes the current shift-speed.

If the target shift-speed is calculated, the controller 20 determines the adjusted shift-speed based on the target shift-speed, the radius of curvature of the front road, and the short term driving tendency factor at step S180. As shown in FIG. 3, the adjusted shift-speed according to the radius of curvature of the front road and the short term driving tendency factor are stored in advance. It is exemplified in FIG. 3 but is not limited that the target shift-speed is eighth forward speed and the short term driving tendency factor is classified five regions. The five regions are "extra sporty", "sporty", "normal", "mild", and "extra mild" regions. The "extra sporty" region is a region where the short term driving tendency factor is 80%-100%, the "sporty" region is a region where the short term driving tendency factor is 60%-80%, the "normal" region is a region where the short term driving tendency factor is 40%-60%, the "mild" region is a region where the short term driving tendency factor is 20%-40%, and the "extra mild" region is a region where the short term driving tendency factor is 0%-20%. As shown in FIG. 3, the adjusted shift-speed is maintained under the same target shift-speed and the same radius of curvature at each region.

If the radius of curvature of the front road is R, the adjusted shift-speed for the driver in the "extra sporty" region is fourth forward speed, the adjusted shift-speed for the driver in the "sporty" region is sixth forward speed, the adjusted shift-speed for the driver in the "normal" region is seventh forward speed, and the adjusted shift-speed for the driver in the "mild" region or the "extra mild" region is eighth forward speed. That is, the closer to the "extra sporty" region the driver's tendency is, the more the shift-speed is lowered so as to provide strong engine brake.

In addition, if the radius of curvature of the front road is greater than or equal to R1, the target shift-speed is not adjusted and the shift to the target shift-speed is performed because influence of the radius of curvature on the driving tendency of the driver is very low.

After the adjusted shift-speed is determined, the controller 20 controls the shift to the determined adjusted shift-speed at step S190. That is, the controller 20 controls the transmission 30 and the engine 40 so as to complete engagement of the adjusted shift-speed before the vehicle enters the curvature road. Since the adjusted shift-speed is optimum shift-speed set according to the driving tendency of the driver and the radius of curvature of the front road, the adjusted shift-speed may be determined regardless of manipulation of the driver. Therefore, even though the input variables change while controlling the shift to the adjusted shift-speed, the controller 20 continues to perform the shift to the adjusted shift-speed.

Meanwhile, if the shift control condition according to the driving tendency is not satisfied at the step S110 nor the curvature road does not exist in front of the vehicle at the step S130, the controller 20 calculates the target shift-speed from the shift pattern map based on the vehicle speed and the position of the accelerator pedal at step S200, and controls the shift to the calculated target shift-speed at step S210.

It is exemplified in the above described exemplary embodiment but is not limited that the shift-speed is adjusted. In various exemplary embodiments, the controller 20 calculates target vehicle speed based on the position of the accelerator pedal and the current vehicle speed, determines adjusted vehicle speed based on the short term driving tendency factor, the radius of curvature of the front road, and the target vehicle speed, and controls the transmission 30 and the engine 40 so as for the vehicle to run with the adjusted vehicle speed.

As described above, since the vehicle runs at the optimum shift-speed according to the driving tendency of the driver and the radius of curvature of the front road, fuel economy may be enhanced and risk of accidents may be lowered according to an exemplary embodiment of the present invention.

In addition, a sporty driver can feel strong engine brake and a mild driver can fell weak engine brake. Therefore, customer satisfaction may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A system of controlling shift for a vehicle comprising:
an accelerator pedal position sensor detecting a position of an accelerator pedal;
a vehicle speed sensor detecting vehicle speed;
a navigation device configured to provide road information including gradient and radius of curvature of a road; and
a controller receiving information on input variables including the position of the accelerator pedal and the vehicle speed from the accelerator pedal position sensor and the vehicle speed sensor, determining a short term driving tendency factor of a driver and target shift-speed based on the information, receiving information on the radius of curvature of a front road from the navigation device, determining adjusted shift-speed based on the short term driving tendency factor, the radius of curvature of the front road, and the target shift-speed, and controlling the shift to the adjusted shift-speed.

2. The system of claim 1, wherein the navigation device further provides information on the gradient of the road to the controller, and
wherein the controller determines the short term driving tendency factor of the driver by further considering the gradient of the road.

3. The system of claim 1, wherein the controller is configured to control the shift to the target shift-speed when the radius of curvature of the front road is greater than or equal to a predetermined radius of curvature.

4. The system of claim 1, wherein the short term driving tendency factor of the driver is classified into at least two regions and the adjusted shift-speed is maintained under the same target shift-speed and the same radius of curvature at each region.

5. The system of claim 1, wherein the controller is configured to continue the shift to the adjusted shift-speed even though the input variables change while the shift to the adjusted shift-speed is controlled.

6. A system of controlling shift for a vehicle comprising:
an accelerator pedal position sensor detecting a position of an accelerator pedal;
a vehicle speed sensor detecting vehicle speed;
a navigation device configured to provide road information including gradient and radius of curvature of a road; and
a controller receiving information on input variables including the position of the accelerator pedal and the vehicle speed from the accelerator pedal position sensor and the vehicle speed sensor, determining a short term driving tendency factor of a driver and target vehicle speed based on the information, receiving information on the radius of curvature of a front road from the navigation device, determining adjusted vehicle speed based on the short term driving tendency factor, the radius of curvature of the front road, and the target vehicle speed, and controlling the shift to the adjusted vehicle speed.

7. The system of claim 6, wherein the navigation device further provides information on the gradient of the road to the controller, and
wherein the controller determines the short term driving tendency factor of the driver by further considering the gradient of the road.

8. The system of claim 6, wherein the controller is configured to run the vehicle with the target vehicle speed when the radius of curvature of the front road is greater than or equal to a predetermined radius of curvature.

9. A method of controlling shift for a vehicle comprising:
determining whether a curvature road exists in front of the vehicle based on a current position of the vehicle;
determining radius of curvature of a front road when the curvature road exists in front of the vehicle;
detecting input variables including a position of an accelerator pedal and vehicle speed;
determining a short term driving tendency factor based on the input variables;

determining target shift-speed based on the input variables;

determining adjusted shift-speed based on the target shift-speed, the short term driving tendency factor, and the radius of curvature of the front road; and controlling the shift to the adjusted shift-speed.

10. The method of claim 9, wherein the short term driving tendency factor is determined by further considering gradient of the road.

11. The method of claim 9, wherein the adjusted shift-speed is the same as the target shift-speed when the radius of curvature of the front road is greater than or equal to a predetermined radius of curvature.

12. The method of claim 9, wherein the short term driving tendency factor of driver is classified into at least two regions and the adjusted shift-speed is maintained under the same target shift-speed and the same radius of curvature at each region.

13. The method of claim 9, wherein the adjusted shift-speed does not change even though the input variables change while the shift to the adjusted shift-speed is controlled.

* * * * *